United States Patent
Brunbauer

(10) Patent No.: US 9,809,182 B2
(45) Date of Patent: Nov. 7, 2017

(54) VOLTAGE SUPPLY AND DRIVE SYSTEM FOR A FIRE SERVICE VEHICLE OR RESCUE VEHICLE OR SPECIAL UTILITY VEHICLE AND METHOD FOR CONTROLLING SAME

(71) Applicant: Rosenbauer International AG, Leonding (AT)

(72) Inventor: Gottfried Brunbauer, Aschach/Steyr (AT)

(73) Assignee: Rosenbauer International AG, Leonding (AT)

( * ) Notice: Subject to any disclaimer, the term of this patent is extended or adjusted under 35 U.S.C. 154(b) by 388 days.

(21) Appl. No.: 14/430,295

(22) PCT Filed: Sep. 24, 2013

(86) PCT No.: PCT/AT2013/050194
§ 371 (c)(1),
(2) Date: Apr. 22, 2015

(87) PCT Pub. No.: WO2014/043734
PCT Pub. Date: Mar. 27, 2014

(65) Prior Publication Data
US 2015/0246649 A1  Sep. 3, 2015

(30) Foreign Application Priority Data

Sep. 24, 2012  (AT) .................................... 1038/2012

(51) Int. Cl.
*B60L 1/00*   (2006.01)
*B60R 16/03*  (2006.01)
(Continued)

(52) U.S. Cl.
CPC .............. *B60R 16/03* (2013.01); *B60L 11/12* (2013.01); *H02K 7/1815* (2013.01); *Y02T 10/7005* (2013.01); *Y02T 10/7077* (2013.01)

(58) Field of Classification Search
CPC ...... B60R 16/03; B60L 11/12; Y02T 10/7005; Y02T 10/7077
(Continued)

(56) References Cited

U.S. PATENT DOCUMENTS

| 4,870,811 A * | 10/1989 | Steele ................. A01D 34/001 56/10.5 |
| 2003/0104899 A1* | 6/2003 | Keller ..................... B60K 6/26 477/2 |

(Continued)

FOREIGN PATENT DOCUMENTS

| CN | 101239591 A | 8/2008 |
| CN | 101730631 A | 6/2010 |
| DE | 10252507 A1 | 5/2004 |
| WO | 2008/067252 A2 | 6/2008 |

OTHER PUBLICATIONS

International Search Report of PCT/AT2013/050194, dated Apr. 7, 2014.

*Primary Examiner* — Thomas Skibinski
(74) *Attorney, Agent, or Firm* — Collard & Roe, P.C.

(57) ABSTRACT

A voltage supply and drive system for a fire service vehicle or rescue vehicle or special utility vehicle has at least one drive source and having a plurality of voltage sources which are connected to one another by an electrical power system, and a control device. At least one of the voltage sources is formed by a battery, characterized in that the control device is designed to connect or disconnect one or more voltage sources and/or one or more drive sources taking into account at least one emission value of at least one of the voltage sources and/or at least one of the drive sources. As a result, the voltage and/or drive sources which are integrated into
(Continued)

Figure 1:
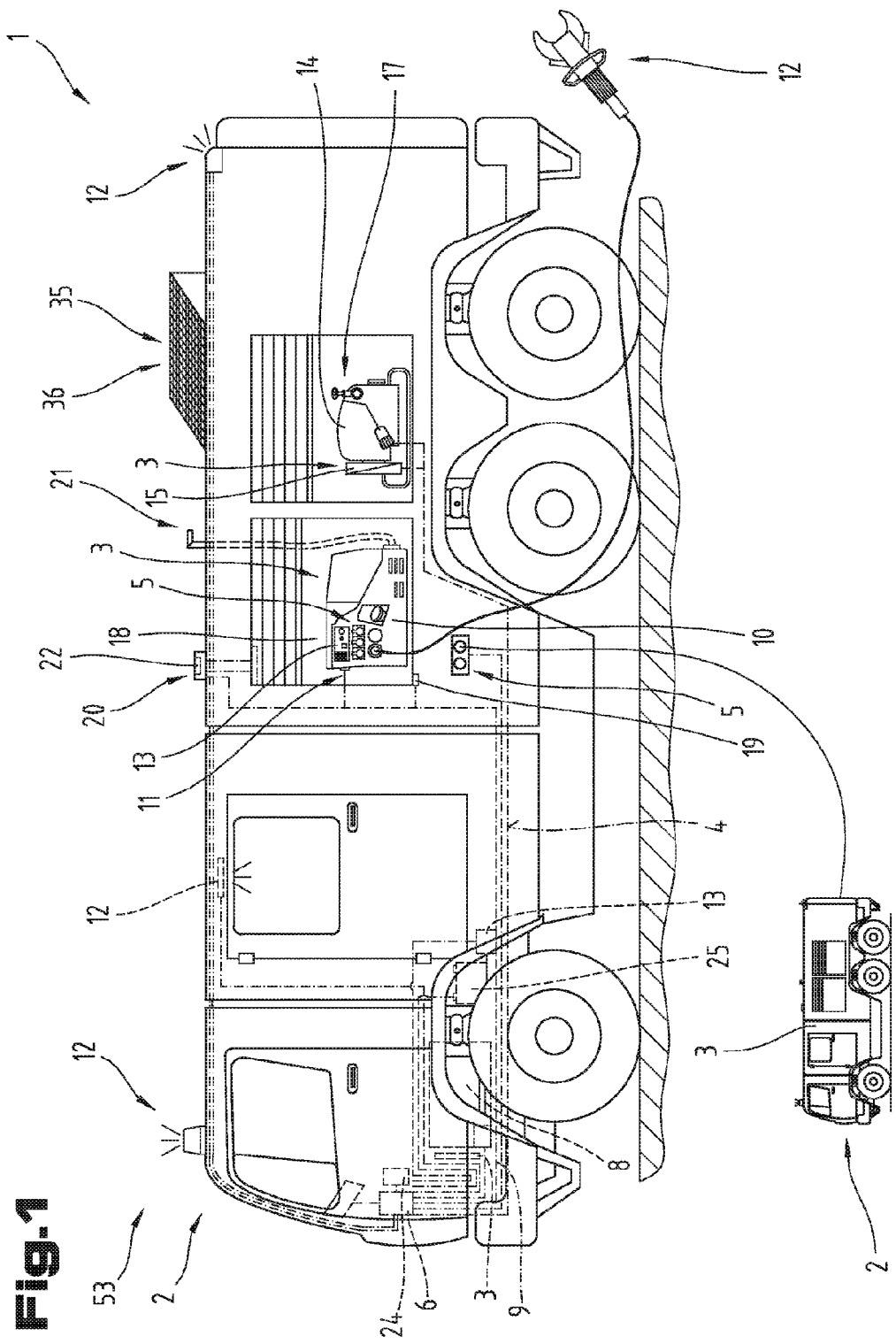

the voltage supply and drive system of the fire service vehicle and rescue vehicle or special utility vehicle can be operated, combined in such a way that an overall minimal emission value can be achieved.

17 Claims, 5 Drawing Sheets

(51) Int. Cl.
*B60L 11/12* (2006.01)
*H02K 7/18* (2006.01)

(58) Field of Classification Search
USPC .................. 307/9.1, 10.1, 10.6, 10.7, 10.8; 320/103–105, 107–115
See application file for complete search history.

(56) References Cited

U.S. PATENT DOCUMENTS

| | | |
|---|---|---|
| 2003/0158640 A1 | 8/2003 | Pillar et al. |
| 2004/0024502 A1 | 2/2004 | Squires et al. |
| 2007/0219669 A1* | 9/2007 | Schaper .................. H02J 3/00 700/287 |
| 2008/0122195 A1 | 5/2008 | Beeson et al. |
| 2008/0215199 A1 | 9/2008 | Aoyama et al. |
| 2008/0264921 A1 | 10/2008 | Kropp et al. |
| 2009/0194067 A1 | 8/2009 | Peotter et al. |
| 2009/0312899 A1 | 12/2009 | Mitchell et al. |
| 2010/0206100 A1 | 8/2010 | Vyas et al. |
| 2011/0006603 A1 | 1/2011 | Robinson et al. |
| 2011/0146621 A1 | 6/2011 | Weisz et al. |
| 2011/0260875 A1* | 10/2011 | Aarts ...................... G08B 3/02 340/627 |
| 2012/0138318 A1 | 6/2012 | Weisz et al. |

* cited by examiner

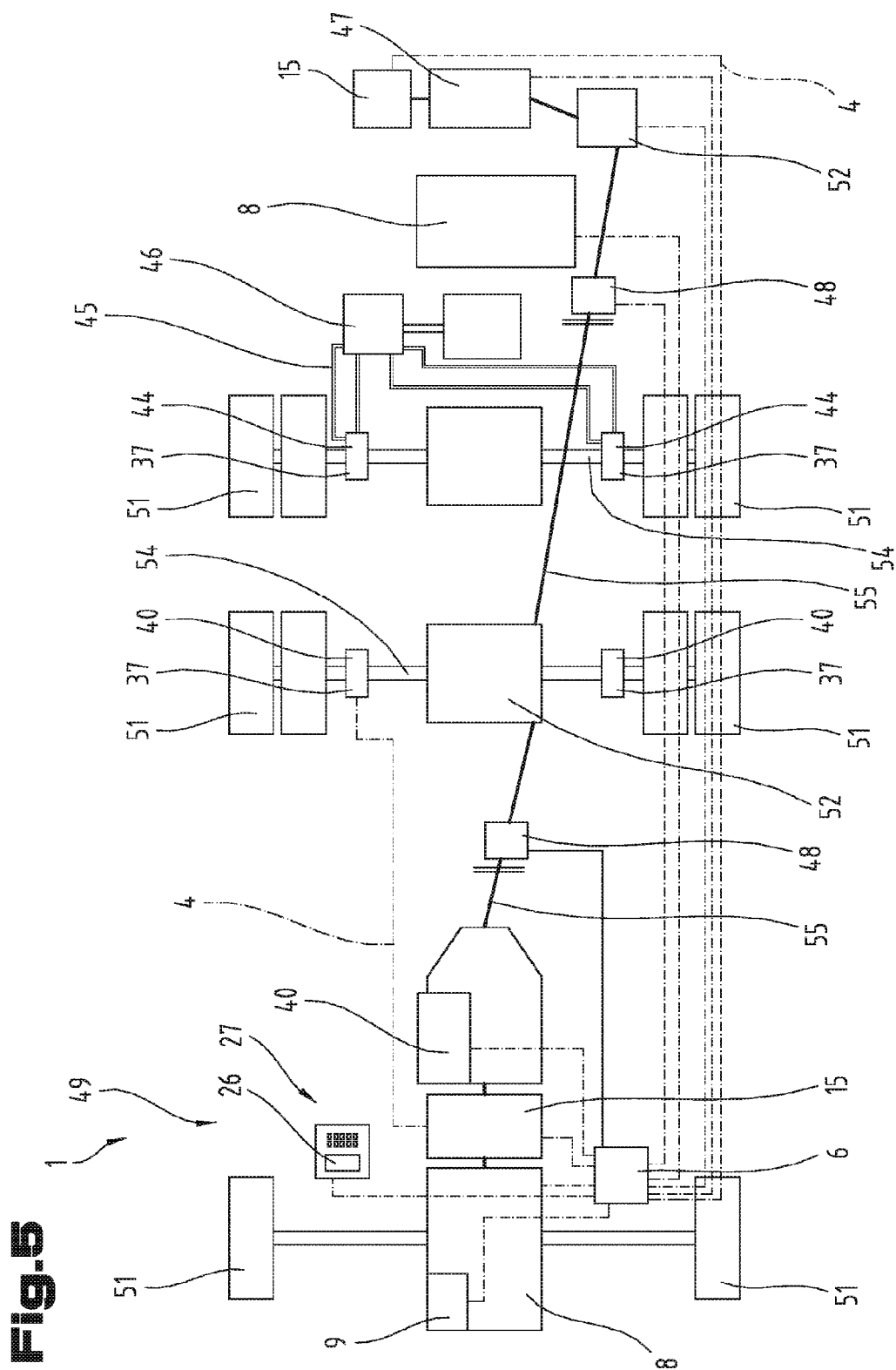

VOLTAGE SUPPLY AND DRIVE SYSTEM FOR A FIRE SERVICE VEHICLE OR RESCUE VEHICLE OR SPECIAL UTILITY VEHICLE AND METHOD FOR CONTROLLING SAME

CROSS REFERENCE TO RELATED APPLICATIONS

This application is the National Stage of PCT/AT2013/050194 filed on Sep. 24, 2013, which claims priority under 35 U.S.C. §119 of Austrian Application No. A 1038/2012 filed on Sep. 24, 2012, the disclosure of which is incorporated by reference. The international application under PCT article 21(2) was not published in English.

The invention relates to a voltage supply and drive system for a fire service vehicle or rescue vehicle or special utility vehicle, having at least one drive source and having multiple voltage sources that are connected with one another by way of an electrical line network, and a control apparatus, wherein at least one of the voltage sources is formed by a battery, characterized in that the control apparatus is configured for connecting or disconnecting one or more voltage sources and/or one or more drive sources, taking into consideration at least one emission value of at least one of the voltage sources and/or at least one of the drive sources.

The invention likewise relates to a method for controlling a voltage supply and drive system for a fire service vehicle or rescue vehicle or special utility vehicle.

The invention furthermore relates to a voltage supply system for a fire service vehicle or rescue vehicle or special utility vehicle, having multiple voltage sources that are connected with one another and with a consumer interface by way of an electrical line network, and a control apparatus and a voltage measurement apparatus, wherein at least one of the voltage sources is formed by an alternator connected with a travel motor so as to form a drive.

The invention furthermore relates to a method for controlling a voltage supply system.

US 2009194067 A1 shows an energy management system for a Service Packet. This Service Packet comprises a Service Motor and, depending on the exemplary embodiment, further components such as air filters or coolers. This Service Pack is pre-installed into the work vehicle. Likewise, a voltage measurement apparatus and controller of the Service Pack as a function of this voltage measurement are shown.

A method for operating an energy management system is known from US 2011006603A1. Using this method, a network of energy sources and consumers can be built up.

An idle-reduction system for fire service vehicles or rescue vehicles is already known from US 2011146621 AA. In the embodiment disclosed there, it is disadvantageous that an additional generator, installed in the vehicle in fixed manner, is required.

It is now the task of the invention to ensure minimal emission values by means of an optimal combined operation of voltage sources and/or drive sources.

This task is accomplished, according to the invention, using an apparatus of the type stated initially, in that the control apparatus is configured for connecting or disconnecting one or more voltage sources and/or one or more drive sources, taking into consideration at least one emission value of at least one of the voltage sources and/or at least one of the drive sources.

The solution according to the invention makes it possible for the voltage sources and/or drive sources tied into the voltage supply and drive system of the fire service vehicle and rescue vehicle or special utility vehicle to be operated in combined manner, in such a manner that a minimal total emissions value can be achieved.

The task is furthermore accomplished, according to the invention, using a method of the type stated initially, in that a selection of a voltage source for operating a consumer and/or the drive source, and turning on, connecting and disconnecting a voltage source and/or a drive source by means of a control apparatus takes place taking into consideration at least one emission value of the voltage source and/or of the drive source, in each instance.

This further solution according to the invention makes it possible to turn on, connect or disconnect voltage sources or drive sources in such a manner that the most advantageous one or ones, with regard to the desired emission value, can be connected or turned on.

The task is furthermore accomplished, according to the invention, using a method of the type stated initially, comprising the following steps:

determining a power need and/or voltage need, determining or calling up emission values of the voltage sources 3 and/or of the drive sources, calculating the sum of the emission values of combinations of voltage sources and/or of drive sources per emission value, determining the specific combination of voltage sources and/or drive sources that yields the smallest sum of the emission values with regard to a type of emission, turning on, connecting or disconnecting voltage sources and/or drive sources in accordance with the previously determined combination of voltage sources and/or drive sources, as a function of an operating mode.

By means of this further solution according to the invention, it is possible to calculate a combination of voltage sources and/or drive sources that is optimized in terms of emission values, with regard to the selected operating mode and emission types, and to then operate it in this manner. As a result, unnecessary emissions can be avoided.

An advantageous variant of the invention provides that the control apparatus is configured for connecting and disconnecting one or more voltage sources or drive sources, taking into consideration at least one emission value stored in a memory. In this way, ongoing measurement and calculation of the emission values can be eliminated.

Furthermore, it can be provided that the control apparatus is configured for connecting and disconnecting one or more voltage sources and/or drive sources, taking into consideration at least one emission value determined by an emissions sensor. This brings with it the advantage that up-to-date emission values can be used, and even more precise control is made possible in this way.

According to a further embodiment of the invention, the emissions sensor can be configured for measuring at least one of the emission types such as noise, carbon monoxide, carbon dioxide, fine dust, soot, sulfur dioxide, nitrogen oxide, benzene, methane, heat, and smoke, in order to thereby make it possible to take many different emissions into consideration.

A particularly advantageous variant of the invention, which provides at least one sensor for determining conditions of the operating environment, brings with it the advantage that the environment of use can also be taken into consideration in the controlling process.

Another advantageous further development of the invention results from the fact that at least one geographic position recognition system for determining the operating environment is provided. By means of this system, data regarding the operating environment that are already available can be utilized.

A particularly advantageous variant of the invention provides that the control apparatus is configured for connecting and disconnecting one or more voltage sources and/or drive sources as a function of an operating mode. In this way, it is possible to optimally coordinate the power supply and/or drive supply to the requirements of use.

A further very advantageous variant of the invention provides that the control apparatus is configured for connecting and disconnecting one or more voltage sources and/or drive sources as a function of the conditions of the operating environment. In this way, external influences, particularly hazards, can also be taken into consideration for the selection of the operated voltage sources and/or drive sources.

In order to utilize devices that are usually present in any case and can be used in flexible manner also for supplying voltage, at least one further voltage source can be formed by a electricity generator that can be taken out of the fire service vehicle or rescue vehicle or special utility vehicle and can be operated independent of the electrical line network.

It brings with it a particular advantage that a further travel motor for driving the fire service vehicle or rescue vehicle is disposed in this vehicle. In this way, it becomes possible to move the fire service vehicle or rescue vehicle or special utility vehicle in particularly emission-efficient manner, because travel motors that are not required can be disconnected, and, in particular, exhaust gases and noise are reduced in this way.

It is advantageous if at least one further travel motor is formed by an internal combustion engine or by an electric motor. Depending on the power requirements and duration of use, the optimal auxiliary assembly is made available in this manner.

If the emissions sensor is disposed on the electricity generator, it is advantageously possible to conduct measurements directly at the emissions source.

According to a further advantageous variant of the method according to the invention, the at least one emission value can be stored in the memory and queried by the control apparatus. In this way, fast access to the data for calculations can be ensured.

A flexible method variant can be implemented in that the at least one emission value is determined by an emissions sensor and transmitted to the control apparatus.

The method according to the invention can also provide that the control apparatus combines and turns on, connects, and disconnects the voltage sources or drive sources from multiple voltage sources or drive sources in such a manner that the sum of the emission values of all the connected voltage sources and/or drive sources is minimal for the required power. In this way, the system constantly can be optimally adapted to the requirements.

In a further advantageous further development of the method according to the invention, the control apparatus can combine and turn on, connect or disconnect the voltage sources or drive sources from multiple voltage sources or drive sources, as a function of a selectable or determined operating mode, in such a manner that the sum of the emission values of all the connected voltage sources and/or drive sources is minimal for the required power and/or the power demand to be expected, with regard to at least one type of emission, such as, for example, noise, carbon monoxide, carbon dioxide, fine dust, soot, sulfur dioxide, nitrogen oxide, heat or smoke. In this way, use of the fire service vehicle or rescue vehicle or special utility vehicle that is particularly adapted to the requirements can take place.

It is also the task of the invention to achieve optimized use of multiple or individual voltage sources for supplying voltage to a line network in a fire service vehicle or rescue vehicle.

This task can be accomplished, according to the invention, using an apparatus of the stated type, in that at least one further voltage source is formed by a mobile electricity generator that can be operated independent of the electrical line network, that the electrical line network can be releasably connected with the mobile electricity generator by means of a coupling location, and that the control apparatus is configured for connecting and disconnecting multiple voltage sources, taking into consideration an ongoing measurement of the voltage by means of the voltage measurement apparatus.

The solution according to the invention allows all or individual voltage sources that are typically carried along in a fire service vehicle or rescue vehicle in any case, including mobile electricity generators that can be operated independently, to be able to supply the voltage supply system with current and voltage.

The task can furthermore be accomplished, according to the invention, with a method of the type stated initially, in that the selection of a voltage source for operating a consumer and for connecting and disconnecting one or more voltage sources by means of the control apparatus takes place taking into consideration an ongoing measurement of the voltage by means of the voltage measurement apparatus. A further advantage lies in the fact that modern, environmentally friendly travel motors in a fire service vehicle or rescue vehicle accumulate soot at overly long idle times and the overly low operating temperatures connected with them, and therefore expensive and environmentally polluting burn-out of the travel motors can be eliminated with a reduction of these idle times.

This further possible solution according to the invention makes it possible to make a selection of individual voltage sources on the basis of measured values, in order to be able to operate the voltage supply network efficiently.

An advantageous variant of the invention provides that the voltage source can be connected with a consumer, by way of the consumer interface, by means of the control apparatus. According to this variant of the invention, data and control signals can also be exchanged with the consumer directly, in order to thereby allow even more efficient operation.

Furthermore, it can be provided that multiple voltage sources can be connected with one or more consumers, by way of the one or more consumer interfaces, by means of the control apparatus. This has the advantage that selective connections between a consumer and a voltage source or a group of consumers and a group of voltage sources can be produced, and in this way, for example, different voltages can be made available to the respective consumers simultaneously, by the voltage supply system, and, in turn, an efficient selection can take place.

According to a further embodiment of the invention, the voltage supply system can be supplied exclusively by the mobile electricity generator as a voltage source. Mobile electricity generators are part of standard equipment of fire service vehicles or rescue vehicles, and therefore no further separate electricity generator has to be carried along, which advantageously leads to weight savings and allows more efficient operation at low electricity demand.

A further very advantageous embodiment of the invention provides that the voltage supply system is supplied simultaneously by the mobile electricity generator and by the alternator as voltage sources. It is advantageous, in this connection, that the entire available potential of power of the voltage sources can be utilized for special operating states.

A particularly advantageous variant of the invention, which is characterized by far-reaching usability of external tools, provides that at least one voltage source is configured for output of voltage at 230 volts and 400 volts or 120 volts.

A likewise very advantageous further development of the apparatus according to the invention provides that at least one voltage source, together with a battery charging device or without such a device, is configured for output of voltage at 12 volts, 24 volts or 48 volts. As a result, the traditional electrical on-board network of a fire service vehicle or rescue vehicle can also be integrated into the voltage supply system, and the battery voltage can also be maintained, for example without using the travel motor.

A particularly advantageous variant, which allows the greatest possible flexibility in the combination of different power classes of electricity generators, provides that the mobile electricity generator has a diesel-operated, gasoline-operated or gas-operated drive, which is connected with a generator in terms of drive.

A further embodiment of the invention provides that the mobile electricity generator is a fuel cell. It is advantageous, in this connection, that a fuel cell can be used even in areas that are sensitive to exhaust gas.

In case of particularly constricted space conditions, specifically in smaller fire service vehicles or rescue vehicles, a further electricity generator can be integrated, according to the invention, in that the mobile electricity generator is formed by a drive of a portable fire pump and a generator connected in terms of drive.

Particularly safe operation of an electricity generator accommodated in the fire service vehicle or rescue vehicle can be implemented in that the mobile electricity generator is accommodated in a closable holder in the fire service vehicle or rescue vehicle.

A very advantageous further development of the invention provides that the closable holder has a closure sensor. In this way, it is possible to clarify the prerequisites for safe operation before startup of the electricity generator.

An embodiment of the voltage supply system is characterized in that the closure sensor is configured for emitting an interruption signal to the control apparatus, wherein the interruption signal prevents the operation of the mobile electricity generator. Unintentional startup, in a closure state not intended for this purpose, can thereby be prevented.

According to a variant of the invention that is characterized in that the closable holder has a cooling apparatus, an exhaust gas line apparatus, and an air supply apparatus, operation of the electricity generator can also take place in the closed state of the holder.

A further variant of the invention provides that at least one voltage source is formed by an electrical buffer storage unit. It is advantageous, in this connection, that large amounts of electrical energy can be temporarily stored for a short time, in order to be able to implement booster effects.

An embodiment of the invention that is particularly advantageous because it is environmentally friendly provides that at least one voltage source 3 is formed by a photovoltaic energy production apparatus 36.

A further embodiment of the invention, which guarantees a maximum of supply reliability and efficiency in large deployments, consists in that the voltage supply system can be releasably connected with one or more voltage supply systems of one or more further fire service vehicles or rescue vehicles.

According to a further very advantageous variant of the method according to the invention, selecting a voltage source for operation of a consumer and connecting and disconnecting a voltage source by means of the control apparatus can take place, taking into consideration an ongoing measurement of the voltage by the voltage measurement apparatus and taking into consideration the required power. Voltage supply bottlenecks can be prevented in advance by taking the required power into consideration.

Flexible control during operation can be ensured, according to a further advantageous method variant, in that the voltage source, the consumer, and the control apparatus are controlled by way of bus signals.

The method according to the invention can also provide that the mobile electricity generator can only be operated when the closure sensor of the closable holder of the control apparatus confirms that the closable holder is open. In this way, safe operation can be guaranteed, and overheating as well as a backup of exhaust gases can be prevented.

For a better understanding of the invention, it will be explained in greater detail, using the following figures.

Figure 2:
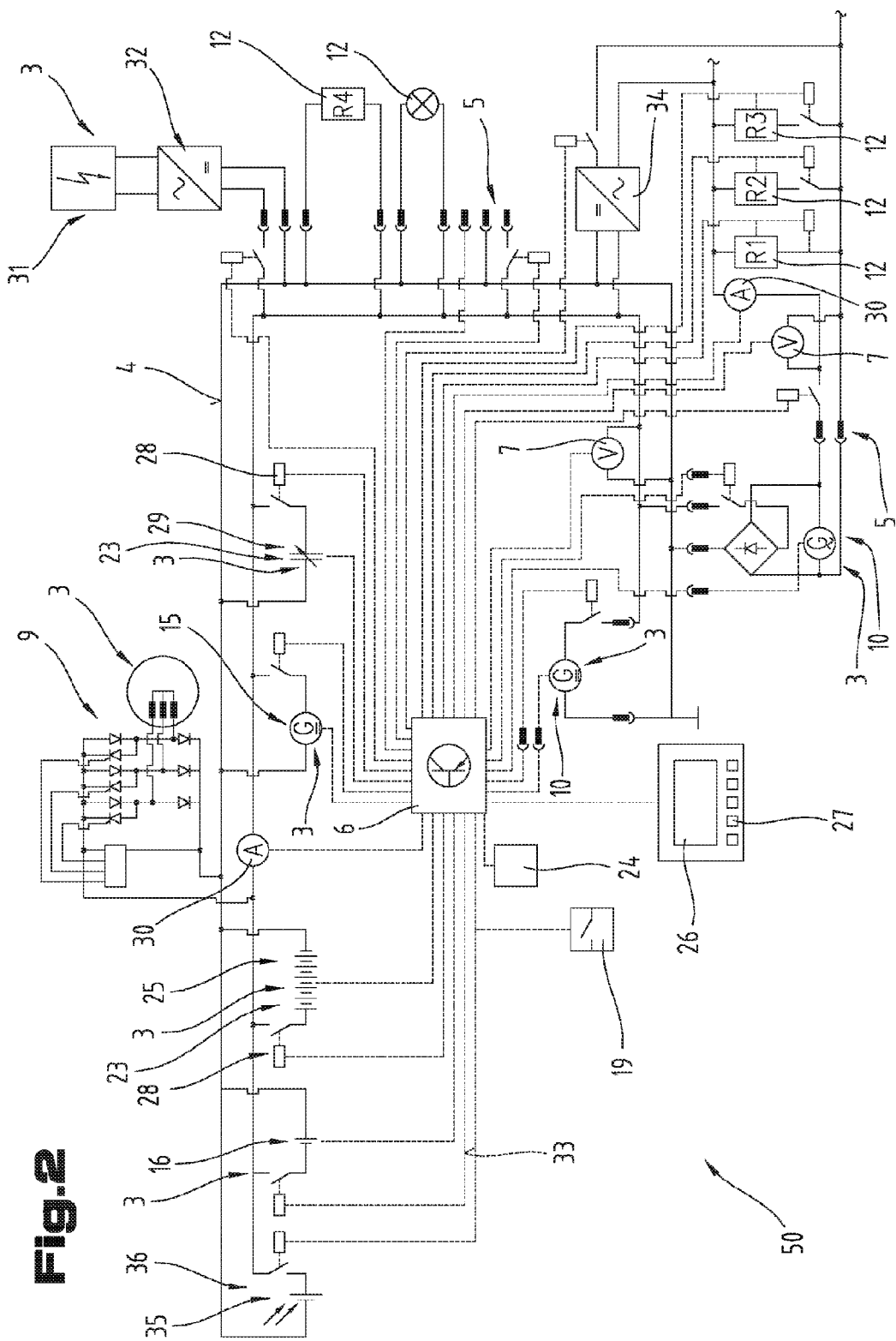
Figure 3:
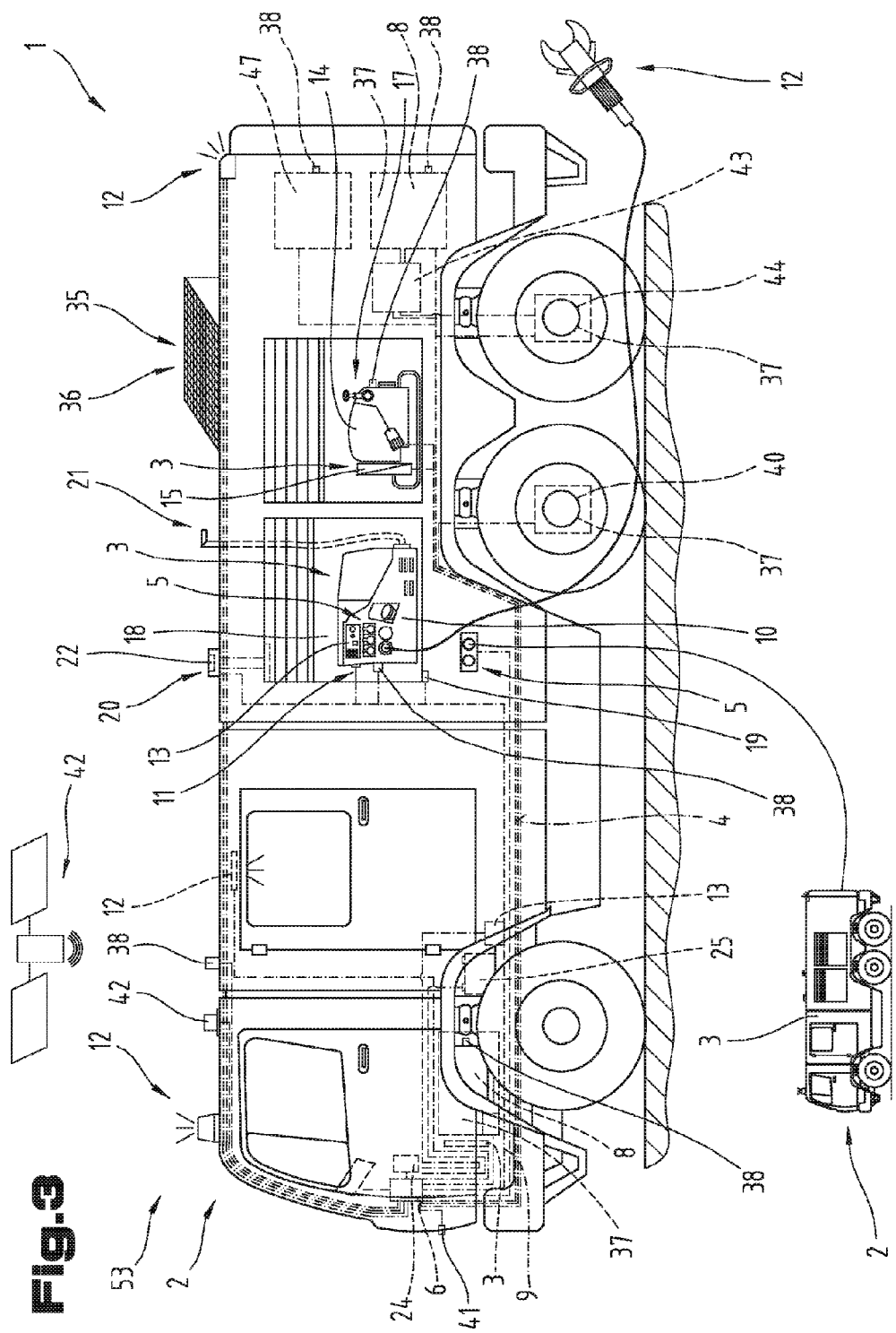
Figure 4:
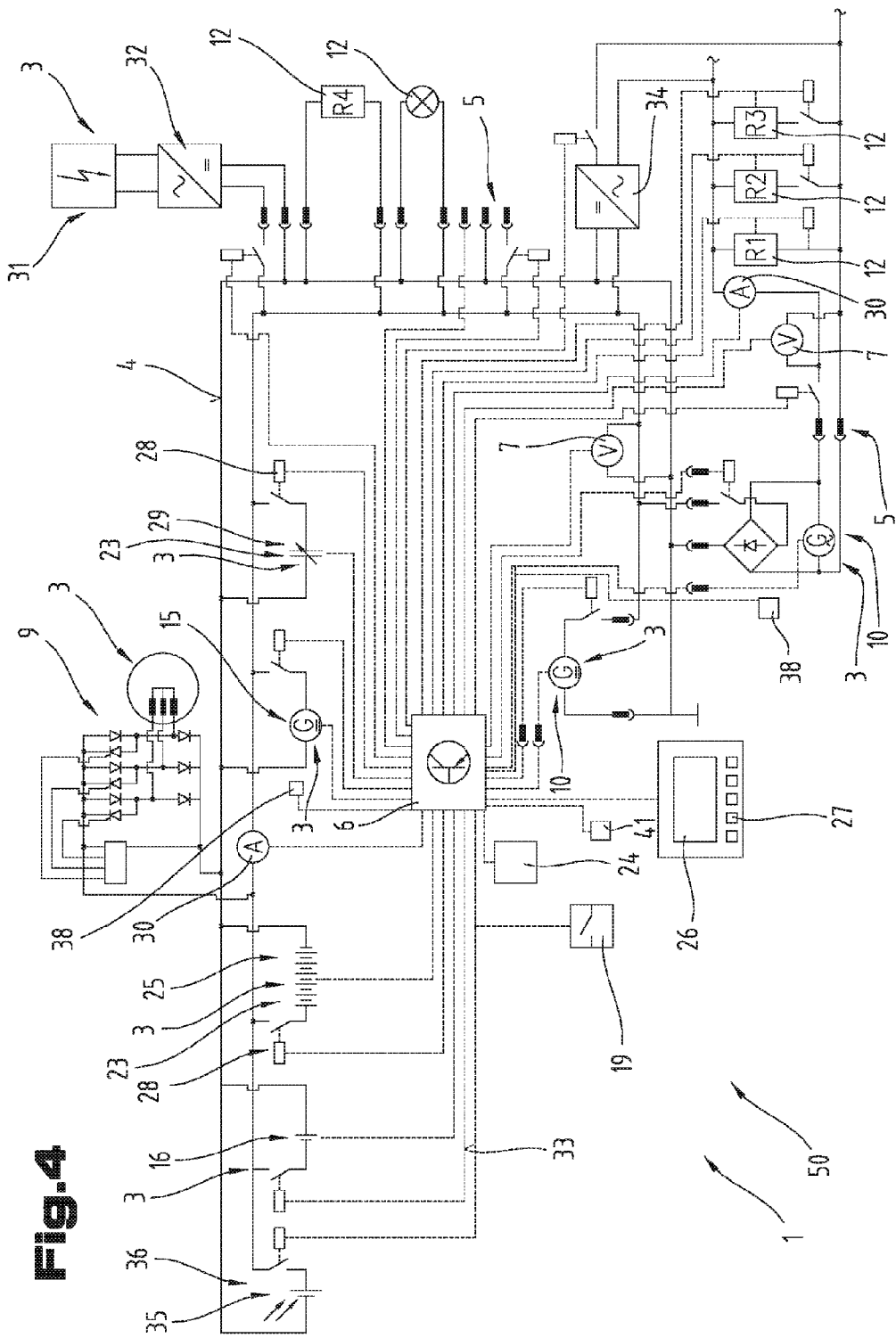

The figures show, in a schematically greatly simplified representation, in each instance:

FIG. 1 schematic representation of a voltage supply system in a fire service vehicle or rescue vehicle;

FIG. 2 schematic wiring diagram of a voltage supply system;

FIG. 3 schematic representation of a voltage supply and drive system in a fire service vehicle or rescue vehicle or special utility vehicle;

FIG. 4 schematic wiring diagram of a voltage supply and drive system;

FIG. 5 schematic representation of a drive system in a fire service vehicle or rescue vehicle or special utility vehicle.

As an introduction, it should be stated that in the different embodiments described, the same parts are provided with the same reference symbols or the same component designations, wherein the disclosures contained in the entire description can be transferred analogously to the same parts having the same reference symbols or the same component designations. Also, position information selected in the description, such as at the top, at the bottom, to the side, etc., relates to the figure being directly described and shown, and, in the event of a change in position, must be transferred analogously to the new position.

According to FIG. 1, a voltage supply system 50 according to the invention, for a fire service vehicle or rescue vehicle 2, has multiple voltage sources that are connected with one another and with one or more consumer interfaces 5 by way of an electrical line network 4.

A consumer interface 5 is understood to be any connection of the voltage supply system 1 to an electrical consumer 12 that is suitable for conducting electricity. This connection can be produced, for example, by means of direct line connections, clamping or coupling locations, releasable connections, plug-in connections, by way of electrical or electronic circuits or inductive connections.

Furthermore, the voltage supply system 50 comprises a control apparatus 6, which can be formed, for example, by means of an electrical or electronic controller or a controller having a microprocessor. Such an apparatus can, for example, perform control commands that are triggered manually, on the basis of trigger values stored in one or in more electronic memories 24, or on the basis of logical programming.

Furthermore, a voltage measurement apparatus 7 is provided, wherein at least one of the voltage sources 3 is formed by an alternator 9 connected with a travel motor 8 in terms of drive.

A voltage source 3 is understood to mean any device that can serve to generate or maintain a voltage in the voltage supply system. In particular, electricity production sources as well as electricity storage sources are included in this term, such as, for example, batteries, capacitors, external power networks, generators driven by diesel, gasoline or gas, alternators, generators connected with other devices in a drive connection, as well as all types of fuel cells or chemical energy sources, thermal elements, as well as generators driven by wind power or water power, photovoltaic systems, such as, for example, solar cells and also external energy supply networks.

The voltage supply network 50 comprises at least one further voltage source 3 that is formed by a mobile electricity generator 10 that can be operated independent of the electrical line network 4.

The electrical line network 4 can be releasably connected with the mobile electricity generator 10 by means of a coupling location 11.

The term coupling location should be understood to mean, for example, an apparatus that allows connecting a consumer 12 or a voltage source 3 or a further voltage supply system 1 with the electrical line network 4 of the fire service vehicle or rescue vehicle. This coupling location can particularly allow an electrical connection with the electrical line network by way of a mechanical, magnetic connection, for example. A mechanical coupling connection can particularly be produced by way of an outlet/plug connection, with force fit and/or shape fit.

A mobile electricity generator 10 is understood to be an apparatus for generating electricity, which can be removed from the fire service vehicle or rescue vehicle and can be operated independent of this vehicle. For example, these are generators coupled with diesel-operated, gasoline-operated or gas-operated drives, as well as fuel cells operated with turbines as well as piston engines, or also photovoltaic system, such as solar cells, for example.

The control apparatus 6 is configured for connecting and disconnecting one or more voltage sources 3, taking into consideration an ongoing measurement of the voltage by means of the voltage measurement apparatus V.

Connecting and disconnecting one or more voltage sources is understood to mean an interruption or production of the electrical connection with the electrical line network that proceeds from the control apparatus 6, as well as, for example, also turning on or turning off, i.e. starting or shutting off a voltage source 3 and/or a consumer 12, wherein the commands take place manually or automatically on the basis of reference values stored in one or more memories 24.

The mobile electricity generator 10 can have a diesel-operated, gasoline-operated or gas-operated drive 14, for example, which drive can be connected with a generator 15, in terms of drive.

Likewise, the mobile electricity generator 10 can be formed, for example, by means of a drive 14 of a portable fire pump 17 and a generator 15 connected in terms of drive.

The mobile electricity generator 10 can be accommodated, for example, in a closable holder 18 in the fire service vehicle or rescue vehicle 2. In this connection, the mobile electricity generator 10 can particularly be mounted so as to rotate, guided on rails, held in releasably connectable manner by means of attachment means, attached in suspended or extendable manner. In this connection, the coupling location 11 can be structured in such a manner that all the current-conducting electrical connections, as well as the control lines, are automatically disconnected when the mobile electricity generator 10 is removed, or continue to remain connected with the voltage supply system 50 by way of an extension, such as an extension cable.

The closable holder 18 can preferably have a closure sensor 19. Such a closure sensor 19 can be controlled optically, opto-electronically, magnetically, mechanically, electrically, photo-electrically, pneumatically or hydraulically, for example.

The voltage supply system 3 can be releasably connectable also with one or more voltage supply systems 3 of one or more further fire service vehicles or rescue vehicles 2, for example. Such a connection can particularly be produced by way of cables, by way of cables guided in water hoses, but also inductively.

In FIG. 2, a further embodiment of the voltage supply system 1 and of the method for control of the same is shown, which embodiment can also be independent, if necessary, wherein once again, the same reference symbols or component designations as in the preceding FIG. 1 are used for the same parts. In order to avoid unnecessary repetition, reference is made to the detailed description of the preceding FIG. 1.

As shown in FIG. 2, a voltage source 3, for example, can be connected with a consumer 12 by way of the consumer interface 5, by means of the control apparatus 6. However, in particular, multiple voltage sources 3 can be connected with one or more consumers 12, by way of the one or multiple consumer interfaces 5, by means of the control apparatus 6.

The voltage supply system 50 can be supplied exclusively from the mobile electricity generator 10 as a voltage source 3, for example. In this variant, the travel motor 8 and the alternator 9 connected with it in terms of drive can be shut off. The mobile electricity generator can be configured for giving off different voltages. For example, vehicle-internal consumers 12 and external consumers such as rescue devices, light sources or charging devices can be supplied.

However, the voltage supply system 50 can also be supplied simultaneously by the mobile electricity generator 10 and by the alternator 9 as voltage sources 3, for example. Sufficient voltage and current supply of a plurality of consumers 12 or of a very high-power consumer can be implemented in this manner.

At least one voltage source 3 can be configured for output of voltage at 230 volts and 400 volts or 120 volts. Of course, other usual voltage can also be made available using such an apparatus.

At least one voltage source 3 can be configured together with a battery charging device 13 or without such a device, for output of voltage at 12 volts, 24 volts or 48 volts. A voltage source 3 can therefore maintain a specific voltage in the battery along with or in place of the charging system integrated into the fire service vehicle or rescue vehicle.

The voltage supply system 50 can also comprise multiple electrical line networks 4 that are physically separated or separated in terms of circuitry, for example by means of power inverters, in order to be able to produce and make available both alternating current and direct current.

The mobile electricity generator 10 can also be formed by a fuel cell 16, for example.

A closure sensor 19, for example, can be disposed in or on the closable holder 18. This sensor can be configured for outputting a signal to the control apparatus 6, which signal can prevent interrupting operation or preventing startup of an electricity generator 10. Of course, the apparatus can also be configured for generating a release signal in order to be able to start or restart the electricity generator 10.

The controller 6 can ensure, for example, that the mobile electricity generator 10 can only be operated if the closure sensor 19 of the closable holder 18 of the control apparatus 6 confirms that the closable holder 18 is open.

In a further possible embodiment variant, a voltage source 3 can be formed by an electrical buffer storage unit 23. In particular, the buffer storage unit can be formed by a capacitor 29.

Selecting a voltage source 3 for operating a consumer 12 and connecting and disconnecting one or more voltage sources 3 takes place by means of the control apparatus, taking into consideration an ongoing measurement of the voltage by means of the voltage measurement apparatus 7. A selective connection between individual voltage sources 3 and consumers 12 can be implemented, for example. Voltage measurement apparatuses 7 can be disposed at different locations in the electrical line network 4, for example. In particular, the voltage measurement apparatus 7 is connected with the control device 6 and can serve as a sensor for this control device 6.

Selecting a voltage source 3 for operating a consumer 12 and connecting and disconnecting a voltage source 3 by means of the control apparatus 6 can take place, for example, taking into consideration an ongoing measurement of the voltage by the voltage measurement apparatus 7, and taking into consideration the required power. The required power can be queried, for example, by way of values stored in a memory 24 for individual consumers 12, by the control apparatus 6, or can be introduced by means of entries by a user. Likewise, of course, one or more current measurements can also take place by way of current measurement apparatuses 30 and flow into the controller.

The voltage source 3, the consumer 12, and the control apparatus 6 can be controlled by way of bus signals, for example. However, any system for data transmission between multiple subscribers, such as controllers, sources, and consumers, by way of a common transmission path in which the subscribers are not participating in the data transmission between other subscribers, can be used. For example, a CAN field, field bus, IEB, bus or also Ethernet can be used.

Switches 28 can be connected with the controller 6, as shown in FIG. 2. Consumers 12 and voltage sources 3 can be connected or disconnected by means of these switches 28.

Both consumers 12 and voltage sources 3 and mobile electricity generators 10 can be releasably connected with the voltage supply system by way of user interfaces 5 and coupling locations 11 disposed there, for example. In particular, these coupling locations 11 can also produce a connection with the control lines 33, in order to thereby be able to pass control signals of the control apparatus 6 to consumers 12 and to voltage sources 3 and mobile electricity generators 10.

The voltage supply system 50 can have one or more electronic memories 24 for storing data, assigned to the control device(s) 6. In particular, values, performance data, control logic, and executable programs for control can be stored in these memories.

The electrical line network 4 of the voltage supply system 1 can be connected, for example, to external electricity supply networks; in any case, such networks can be understood to be public energy networks, household supply networks, charge-maintaining networks, and charging stations.

For example, a display 26 and/or an operating unit 27 can be assigned to the controller 6. These allow interaction of the user with the voltage supply system 50 for monitoring, for intervention in the controller, or purely for information.

At least one voltage source 3 can be formed, for example, by means of a photovoltaic energy production apparatus 36.

Solar cells 35 or other photovoltaic energy production apparatuses 36, for example, can also be integrated into the voltage supply system 50. Such solar cells can be disposed on the fire service vehicle or rescue vehicle 2 in fixed or movable manner. However, it is also possible to affix the solar cells 35 on mobile apparatuses and to dispose them outside of the fire service vehicle or rescue vehicle 2. In particular, these photovoltaic energy production apparatuses 36 can be used in the voltage supply system 50 for operating air conditioning or cooling apparatuses.

A photovoltaic energy production apparatus 36 is understood to be an apparatus that converts solar light energy or radiation energy into electrical current.

According to FIG. 3, a voltage supply and drive system 1 for a fire service vehicle or rescue vehicle 2 or special utility vehicle 53 has at least one drive source 37 and multiple voltage sources 3, which are connected with one another by way of an electrical line network 4. The drive sources, in turn, can be electrically or hydraulically or mechanically connected, for example, with the wheels or other mechanically driven machines such as the firefighting water pump 47.

The term special utility vehicle is understood to mean utility vehicles that find use, for example, for conducting work deployments, service work, maintenance work, construction work, salvage work, lifting loads or for communal, channel or cleaning deployment. For example, these special utility vehicles can also be specifically coordinated to the needs of the operation.

The voltage supply and drive system 1 is formed, for example, from a voltage supply system 50 and a drive system 49. Components of the voltage supply system 50, particularly voltage sources 3 and electricity generators, can also be used to supply drive sources 37 with energy. Likewise, devices of the drive system 49, particularly drive sources 37, such as a travel motor 8, an alternator 9, a hydraulic oil motor 44, can be used to drive electricity production apparatuses such as a generator 15, or can produce electricity directly and pass it into the voltage supply system 50.

At least one of the voltage sources 3 is formed by a battery 25. This battery can be, for example, a pure starter battery such as a rechargeable lead battery or other rechargeable battery, and can serve as a voltage source for small consumers. However, it is also possible that this battery is provided as a large rechargeable battery that also allows travel of the fire service and rescue vehicle 2 or special utility vehicle 53, for example by way of one or more electric motors 40. Rechargeable batteries on the basis of lithium, such as rechargeable lithium ion batteries, rechargeable lithium polymer batteries, or rechargeable lithium-air batteries, for example, can serve as rechargeable batteries.

Furthermore, the voltage supply and drive system 1 comprises a control apparatus 6, which can be formed, for example, by means of an electrical or electronic controller or a controller that has a microprocessor. Such an apparatus can perform control and/or regulation commands, for example, which are triggered manually, on the basis of trigger values stored in one or in multiple electronic memories 24, such as emission values, or on the basis of logical programming.

The control apparatus 6 is configured for connecting and disconnecting one or more voltage sources 3 and/or one or more drive sources 37, taking into consideration at least one emission value of at least one of the voltage sources 3 and/or at least one of the drive sources 37. The control apparatus 6 can, for example, only turn voltage sources on or connect them or can turn different combinations of voltage sources and drive sources on or connect them. Likewise, it is possible, for example, to utilize only specific combinations of drive sources for different tasks such as travel or driving a firefighting water pump 47.

Emission value means a numerical value for a quantitative determination of an emission that proceeds from a machine. An emission value must be classified as an emission type. Emission values can be determined in advance, in a laboratory, for example, and stored, in concrete terms, in a memory 24, for a very specific component of the voltage supply and drive system 1 of the fire service vehicle and rescue vehicle 2 or special utility vehicle 57, for a machine operated with it or in its immediate vicinity. Of course, it is also possible to measure individual or all emission values by means of sensors 41 and to transmit them directly to the control apparatus 6 and/or to store them in the memory. For example, different measurement variables can be used for emission values of different emission types.

For a voltage source 3 or a drive source 37 that does not cause any emissions in an emission type, an emission value of 0 for this emission type is stored in the memory 24, for example.

From the emission values stored in the memory 24, a table can be obtained, for example, in which the respective determined and stored or measured emission values are assigned to a voltage source 3 or a drive source 37 for the different emission types.

Taking into consideration the emission value can take place in such a form, for example, that for connecting and disconnecting one or more voltage sources 3 or drive sources 37, at least one emission value relating to a voltage source 3 or drive source 37 stored in a memory 24 is called up by the control apparatus 6, and then, for example, the voltage source 3 or drive source 37 that brings with it the lowest emission is connected or turned on. However, it is also possible, for example, that an emission value determined by an emissions sensor 38 serves to connect and disconnect one or more voltage sources 3 and/or drive sources 37. This value can be transmitted to the control apparatus 6 by the emissions sensor 38 after it has been determined, or can be queried by the control apparatus 6, for example, directly at the emissions sensor 38 or at a memory 24, where the emission values can be temporarily stored.

The emissions sensor 38 can be configured for measuring emission types such as noise, carbon monoxide, carbon dioxide, fine dust, soot, sulfur dioxide, nitrogen oxide, benzene, methane, heat, and smoke.

The emissions sensor 38 can function according to physical, chemical, biochemical or electrical measurement principles, for example. Examples of such measurement methods are: resistive, chemo-resistive, optical, acoustic, molecular mass, diffusion behavior; reactivity, oxidizability, reducibility, capacitative, potentiometric, amperometric, thermal, thermo-chemical, thermal/physical, gravimetric, biochemical. Commercially available sensors can be used as emissions sensors 38 for these stated measurement methods.

The term emission type defines the type of emission that proceeds from, is discharged or ejected by the voltage supply and drive system 1 of the fire service vehicle and rescue vehicle 2 or special utility vehicle 57 and/or its components and/or other machines operated in the immediate vicinity of the fire service vehicle and rescue vehicle 2 or special utility vehicle 57. For example, exhaust gas, noise, carbon monoxide, carbon dioxide, fine dust, soot, sulfur dioxide, nitrogen oxide, benzene, methane, heat, vibration, particles, and smoke can be regarded as emission types.

Furthermore, at least one sensor 41 for determining conditions of the operating environment can be provided.

Conditions of the operating environment are, for example, the temperature at the place of deployment, the oxygen concentration, gas concentration in the immediate vicinity of the fire service vehicle and rescue vehicle 2 or of the special utility vehicle 57, the light conditions, the smoke concentration, the carbon monoxide concentration, the carbon dioxide concentration, the methane concentration, the concentration of volatile organic components, the air pressure, the wind, the wind direction, the humidity, the radioactivity, the concentration of chemical substances in the air or on the ground. Conditions of the operating environment can be determined or measured using a sensor 41, for example.

The control apparatus 6 can now be configured, for example, for connecting and disconnecting one or more voltage sources 3 and/or drive sources 37 as a function of the conditions of the operating environment. Also, an operating mode can be selected by the control apparatus 6, for example based on the measured conditions of the operating environment, or proposed to the user for selection. This can be done solely or also supplementally by means of a geographic position recognition system (42) such as GPS, Galileo, Glonass, radiolocation systems, mobile location systems, inertia navigation for determining the operating environment. This information can be supplemented, in one variant, by means of map data that can be called up electronically or other electronically available data concerning the location or the deployment object.

In this connection, the term operating environment defines the surroundings of the deployment space of the fire service vehicle and rescue vehicle 2 or of the special utility vehicle 57. For example the geographic location of the site, the elevation, the degree of building development, city or rural surroundings, condition of roads, potential hazards due to the presence of chemical substances, hazardous materials, gases or flammable materials. For example, the deployment of a fire service vehicle and rescue vehicle 2 or special utility vehicle 57 in a tunnel or a roof-covered garage or actually in a building represents a different operating environment from that of open land. Likewise, for example, a nature conservancy area must also be evaluated as a special operating environment. For example, a determination of the operating environment can take place by means of electronic map data, by way of geographical position recognition, sensors 41 for detecting conditions of the operating environment, by way of electronically transmitted data from the central deployment office, electronically captured database data such as those relating to a hazardous substance register or databases of the street-maintaining office or also by means of input or selection of standard operating environments by an operator.

However, the control apparatus 6 can also be configured, in one variant, for connecting and disconnecting one or more voltage sources 3 and/or drive sources 37 as a function of an operating mode.

For example, the sensor 41 can function according to physical, chemical, biochemical or electrical measurement principles. Examples of such methods are: resistive, chemo-resistive, optical, acoustic, molecular mass, diffusion behavior; reactivity, oxidizability, reducibility, capacitative, potentiometric, amperometric, thermal, thermo-chemical, thermal/physical, gravimetric, biochemical. Commercially available sensors can be used as a sensor 41 for these stated measurement methods.

An operating mode allows a combination of different settings, limitations, emission limits or utilization possibilities of the components of the voltage supply and drive system 2. An operating mode can be selected, for example, from multiple operating modes stored in the memory 24, in fixed manner, by the operator, for example, by way of the operating unit 27. It is just as well possible, however, that the control apparatus 6 automatically selects an operating mode based on the measurement values of the sensors 41 and/or the emissions sensors 38 and/or geographical position information from the geographic position recognition system 42, or individually compiles and activates settings for a further new such operating mode. The selected operating mode can be displayed to the user and/or driver on a display 26. Furthermore, data concerning the selected settings and selected voltage sources 3 and/or drive sources 37 can be displayed. In order to be able to act quickly in an emergency situation, the selected operating mode can be changed manually by the operator or driver. For example, an "override" function can therefore serve for allowing an emergency operating mode to be selected, which makes it possible, for example, to operate all the voltage sources 3 and drive source 37 at the same time.

For example, it is also conceivable, for faster travel in a case of deployment, for example in an airport firefighting vehicle, to provide an operating mode that makes many or all the voltage sources and/or drive sources that can be used for drive support usable to achieve greater acceleration or a greater final speed.

At least one further voltage source 3 can be formed by an electricity generator 10 that can be removed from the fire service vehicle or rescue vehicle 2 or special utility vehicle 57 and operated independent of the electrical line network 4. For example, the emissions sensor 38 can also be disposed on or close to the electricity generator 10. The same holds true for the placement of an emissions sensor on other voltage source and/or drive sources.

One or more travel motors 8 for drive of the fire service vehicle or rescue vehicle 2 or special utility vehicle 53 can be disposed in this vehicle.

A travel motor 8 is understood to be a drive source 37 that is able, alone or together with other drive sources 37, to move the fire service vehicle or rescue vehicle 2 or special utility vehicle 53. A travel motor 8 can be formed, for example, by an internal combustion engine 39, such as an internal combustion motor, particularly a diesel motor, gasoline motor or gas motor, but also, for example, by an electric motor 40, hydraulic oil motor 44, hybrid motor or a gas turbine.

With regard to the other characteristics shown in FIG. 3, reference should be made to the figure description of FIG. 1.

In FIG. 4, a further embodiment, which can also be independent, of the voltage supply and drive system 1 or with regard to the method for control of the same is shown, wherein once again, the same reference symbols or component designations are used for the same parts as in the preceding figures. In order to avoid unnecessary repetition, reference is made to the detailed description of the preceding figures.

As shown in FIG. 4, a sensor 41 is connected, for example, with the control apparatus, which can also take on regulation tasks. Control and/or regulation tasks can be performed by the control apparatus 6 as a function of the conditions of the operating environment determined by means of this sensor 41.

The control apparatus 6 can, for example, perform at least one of the following method steps or communicate with other devices for this purpose:
   determining a power demand and/or voltage demand,
   determining or calling up emission values of the voltage sources 3 and/or of the drive sources 37,
   calculating the sum of the emission values of combinations of voltage sources 3 and/or of the drive sources 37 by emission type,
   determining the specific combination of voltage sources 3 and/or drive sources 37 that results in the smallest sum of the emission values with regard to an emission type,
   turning on, connecting or disconnecting voltage sources 3 and/or drive sources 37 in accordance with the previously determined combination of voltage sources 3 and/or drive sources 37 as a function of an operating mode.

The control apparatus 6 can, for example, combine the voltage sources 3 or drive sources 37 from multiple voltage sources 3 or drive sources 37 and turn them on, connect or disconnect them, in such a manner that the sum of the emission values of all the connected voltage sources 3 and/or drive sources 37 is minimal for the required power. The required power can result, for example, from an ongoing measurement of the currently required system power for different demands such as mechanical, electrical or hydraulic. However, future power decrease probabilities or trends can also be calculated by the control apparatus 6. Likewise, for example, different standard power demands for different operating modes can be stored in the memory 24. The emission value is minimal, for example, when the smallest amount of emissions is released by the operation of different voltage sources 3 and/or drive sources 37, at least with regard to one emission type or all or multiple emission types, in order to fulfill the power demand.

The control apparatus 6 can, for example, combine the voltage sources 3 or drive sources 37 from multiple voltage sources 3 or drive sources 37, as a function of the selectable or determined operating mode, or select them for operation and turn them on, connect and disconnect them, in such a manner that the sum of the emission values of all the connected voltage sources 3 and/or drive sources 37 is minimal for the required power and/or power demand to be expected, with regard to at least one emission type or multiple emission types, such as, for example, noise, carbon monoxide, carbon dioxide, fine dust, soot, sulfur dioxide, nitrogen oxide, heat or smoke.

In FIG. 5, a further embodiment of a drive system 49 or for moving the controller of the same, which can also be independent, is shown, wherein once again, the same reference symbols or component designations are used for the same parts as in the preceding figures. In order to avoid unnecessary repetition, reference is made to the detailed description of the preceding figures.

As shown in FIG. 5, the drive system 49 can comprise at least one travel motor and at least one further drive source 37. The force transmission or energy transmission from the drive sources 37 to the wheels can take place by means of mechanical, hydraulic or electrical connections.

For example, a hydraulic drive can be integrated into the fire service vehicle or rescue vehicle 2 or special utility vehicle 53. Such a hydraulic drive can comprise, for example, at least one hydraulic oil pump 47, a hydraulic oil tank 46, hydraulic lines 45, as well as a hydraulic motor 44, in each instance.

Also, a firefighting water pump 47 with or without its own motor can be integrated into the fire service vehicle or rescue vehicle 2 or special utility vehicle 53. This firefighting water pump 47 can be driven by way of shafts 55, for example, by a travel motor 8 or another drive source 37. A shaft 55 can be connected with a drive axle 54 or directly with another device, in terms of drive, in separable manner, for example by means of a clutch 48.

Individual wheels 51 or double wheels and/or a drive axle 54 and/or a hydraulic oil pump 43 can be connected with an electric motor 40 with force fit.

The control apparatus 6 can be operated jointly with or separately from the voltage supply system 50, for example. To describe the methods or method steps that can be implemented by means of the control apparatus 6, reference is made to the figure description of FIGS. 1 to 4. In this connection, the steps described there can also be understood to refer solely to the combining or turning on, connecting and/or disconnecting voltage sources 37.

The exemplary embodiments show possible embodiment variants of the voltage supply system 50 and or the method for controlling the system, wherein at this point it should be noted that the invention is not restricted to the embodiment variants of the invention specifically shown, but rather, instead, various combinations of the individual embodiment variants with one another are possible, and this variation possibility also lies within the ability of a person skilled in the art of this technical field, on the basis of the teaching for technical action by means of the present invention. Therefore all conceivable embodiment variants that are possible by means of combining individual details of the embodiment variants shown and described are also covered by the scope of protection.

For the sake of good order, it should be pointed out, in conclusion, that for a better understanding of the structure of the voltage supply system 2, it and its components have been shown not true to scale, in part, and/or enlarged and/or reduced in size.

REFERENCE SYMBOL LIST 1 voltage supply system and drive system
2 fire service vehicle or rescue vehicle
3 voltage source
4 electrical line network
5 consumer interface
6 control apparatus
7 voltage measurement apparatus
8 travel motor
9 alternator
10 mobile electricity generator
11 coupling location
12 consumer
13 battery charging device
14 drive
15 generator
16 fuel cell
17 portable fire pump
18 holder
19 closure sensor
20 cooling apparatus
21 exhaust gas discharge apparatus
22 air supply apparatus
23 electrical buffer storage unit
24 memory
25 battery
26 display
27 operating unit
28 switch
29 capacitor
30 current measurement apparatus
31 external energy supply network
32 rectifier
33 control line
34 power inverter
35 solar cells
36 photovoltaic energy production apparatus
37 drive source
38 emissions sensor
39 internal combustion engine
40 electric motor
41 sensor
42 geographic position recognition system
43 hydraulic oil pump
44 hydraulic oil motor
45 hydraulic line
46 hydraulic oil tank
47 firefighting water pump
48 clutch
49 drive system
50 voltage supply system
51 wheel
52 transmission
53 special utility vehicle
54 drive axle
55 shaft

The invention claimed is:

1. A voltage supply and drive system for a fire service vehicle or rescue vehicle or special utility vehicle, having at least one drive source and having multiple voltage sources that are connected with one another by way of an electrical line network, and a control apparatus,
wherein at least one of the voltage sources is formed by a battery,
wherein the control apparatus is configured for connecting or disconnecting one or more voltage sources and/or one or more drive sources, taking into consideration at least one emission value of at least one of the voltage sources and/or at least one of the drive sources, and
wherein an emissions sensor is configured for measuring at least one of the emission types selected from the group consisting of carbon monoxide, carbon dioxide, fine dust, soot, sulfur dioxide, nitrogen oxide, benzene, methane, heat, and smoke.

2. The voltage supply and drive system according to claim 1, wherein the control apparatus is configured for connecting and disconnecting one or more voltage sources or drive sources, taking into consideration at least one emission value stored in a memory.

3. The voltage supply and drive system according to claim 1, wherein the control apparatus is configured for connecting and disconnecting one or more voltage sources and/or drive sources, taking into consideration at least one emission value determined by the emissions sensor.

4. The voltage supply and drive system according to claim 1, wherein at least one sensor for determining conditions of an operating environment is provided.

5. The voltage supply and drive system according to claim 1, wherein at least one geographic position recognition system for determining an operating environment is provided.

6. The voltage supply and drive system according to claim 1, wherein the control apparatus is configured for connecting and disconnecting one or more voltage sources and/or drive sources as a function of an operating mode.

7. The voltage supply and drive system according to claim 1, wherein the control apparatus is configured for connecting and disconnecting one or more voltage sources or drive sources as a function of conditions of an operating environment.

8. The voltage supply and drive system according to claim 1, wherein at least one further voltage source is formed by an electricity generator that can be removed from the fire service vehicle or rescue vehicle and operated independent of the electrical line network.

9. The voltage supply and drive system according to claim 1, wherein at least one further travel motor for drive of the fire service vehicle or rescue vehicle is disposed in the fire service vehicle or rescue vehicle.

10. The voltage supply and drive system according to claim 9, wherein the at least one further travel motor is formed by an internal combustion engine or by an electric motor.

11. The voltage supply and drive system according to claim 1, wherein the emissions sensor is disposed on an electricity generator.

12. A method for controlling a voltage supply and drive system for a fire service vehicle or rescue vehicle or special utility vehicle, having at least one drive source and multiple voltage sources that are connected with one another by way of an electrical line network, wherein selecting a voltage source for operating a consumer and/or the drive source, and turning on, connecting and disconnecting the voltage source and/or the at least one drive source takes place by a control apparatus, taking into consideration at least one emission value of the voltage source and/or of the drive source, in each instance, and wherein an emissions sensor is configured for measuring at least one of the emission types selected from the group consisting of carbon monoxide, carbon dioxide, fine dust, soot, sulfur dioxide, nitrogen oxide, benzene, methane, heat, and smoke.

13. The method for controlling a voltage supply and drive system according to claim 12, wherein the at least one emission value is stored in a memory and queried by the control apparatus.

14. The method for controlling a voltage supply and drive system according to claim 12, wherein the at least one emission value is determined by the emissions sensor and transmitted to the control apparatus.

15. The method for controlling a voltage supply and drive system according to claim 12, wherein the control apparatus combines and turns on, connects, and disconnects the voltage sources or drive sources from multiple voltage sources or drive sources in such a manner that a sum of the emission values of all the connected voltage sources and/or drive sources is minimal for a required power.

16. The method for controlling a voltage supply and drive system according to claim 12, wherein the control apparatus combines the voltage sources or drive sources from multiple voltage sources or drive sources, as a function of a selectable or determined operating mode, and turns the voltage sources or drive sources on, connects and disconnects them in such a manner that a sum of the emission values of all the connected voltage sources and/or drive sources is minimal for a required power and/or power demand to be expected, with regard to the at least one emission type.

17. A method for controlling a voltage supply and drive system for a fire service vehicle or rescue vehicle or special utility vehicle, having at least one drive source and multiple voltage sources that are connected with one another by way of an electrical line network, and a control apparatus, comprising the steps:
　determining a power demand and/or voltage demand,
　determining or calling up emission values of the voltage sources and/or of the drive sources,
　calculating a sum of the emission values of combinations of voltage sources and/or of the drive sources by emission type,
　determining a specific combination of voltage sources and/or drive sources that results in a smallest sum of the emission values with regard to an emission type,
　turning on, connecting or disconnecting voltage sources and/or drive sources in accordance with the previously determined combination of voltage sources and/or drive sources as a function of an operating mode by the control apparatus,
　wherein an emissions sensor is configured for measuring at least one of the emission types selected from the group consisting of carbon monoxide, carbon dioxide, fine dust, soot, sulfur dioxide, nitrogen oxide, benzene, methane, heat, and smoke, and
　wherein the emission sensor measures actual, up-to date emission values and said emission values are evaluated by the control apparatus.

* * * * *